(12) United States Patent
Bravo et al.

(10) Patent No.: US 8,365,547 B2
(45) Date of Patent: Feb. 5, 2013

(54) MACHINE FOR THE PREPARATION AND DISTRIBUTION OF COLD FOOD PRODUCTS

(75) Inventors: Genesio Bravo, Alte Ceccato (IT); Stefano Bravo, Alte Ceccato (IT)

(73) Assignee: G.S.G S.r.l., Vicenza (IT)

( * ) Notice: Subject to any disclaimer, the term of this patent is extended or adjusted under 35 U.S.C. 154(b) by 941 days.

(21) Appl. No.: 12/001,672

(22) Filed: Dec. 12, 2007

(65) Prior Publication Data

US 2008/0148965 A1 Jun. 26, 2008

(30) Foreign Application Priority Data

Dec. 19, 2006 (IT) ................... MI2006A2429

(51) Int. Cl.
- *A23C 3/04* (2006.01)
- *A01J 11/00* (2006.01)
- *B65D 25/40* (2006.01)
- *F25D 27/00* (2006.01)

(52) U.S. Cl. ............... 62/264; 99/455; 99/460; 222/566

(58) Field of Classification Search .................... 99/455, 99/460; 222/566; 62/264; 422/24; 426/248
See application file for complete search history.

(56) References Cited

U.S. PATENT DOCUMENTS

| 4,463,572 | A | * | 8/1984 | Brown, Jr. ........................ 62/135 |
| 4,867,052 | A | * | 9/1989 | Cipelletti ......................... 99/451 |
| 5,874,054 | A | * | 2/1999 | Yelvington .................... 422/309 |
| 6,139,726 | A | * | 10/2000 | Greene ........................... 210/94 |
| 7,175,807 | B1 | * | 2/2007 | Jones .............................. 422/24 |
| 2004/0045575 | A1 | * | 3/2004 | Kinoshita et al. ................. 134/1 |

* cited by examiner

*Primary Examiner* — Henry Yuen
*Assistant Examiner* — Jianying Atkisson
(74) *Attorney, Agent, or Firm* — Hedman & Costigan, P.C.; James V. Costigan

(57) ABSTRACT

A machine (10) for the preparation and distribution of cold food products that is used in the production of soft ice-cream, that has a cylindrical chamber (12) equipped at one end with an inlet mouth (14) for a liquid food mixture and at an opposite end with an extraction tap (18) for the distribution of the cold food product through at least one distribution nozzle (36), wherein said cylindrical chamber (12) is enveloped by an evaporation chamber (20) for the cooling of said liquid food mixture and contains in its interior a mixer (24) wherein underneath said distribution nozzle (36) there is a protection door (62) for said nozzle (36). The machine includes at least one ultraviolet-ray lamp (48) positioned on the math body of the machine (10) in correspondence with a distribution nozzle (36) where the ultraviolet-ray lamp (48) functions to sterilize the distribution nozzle (36).

9 Claims, 4 Drawing Sheets

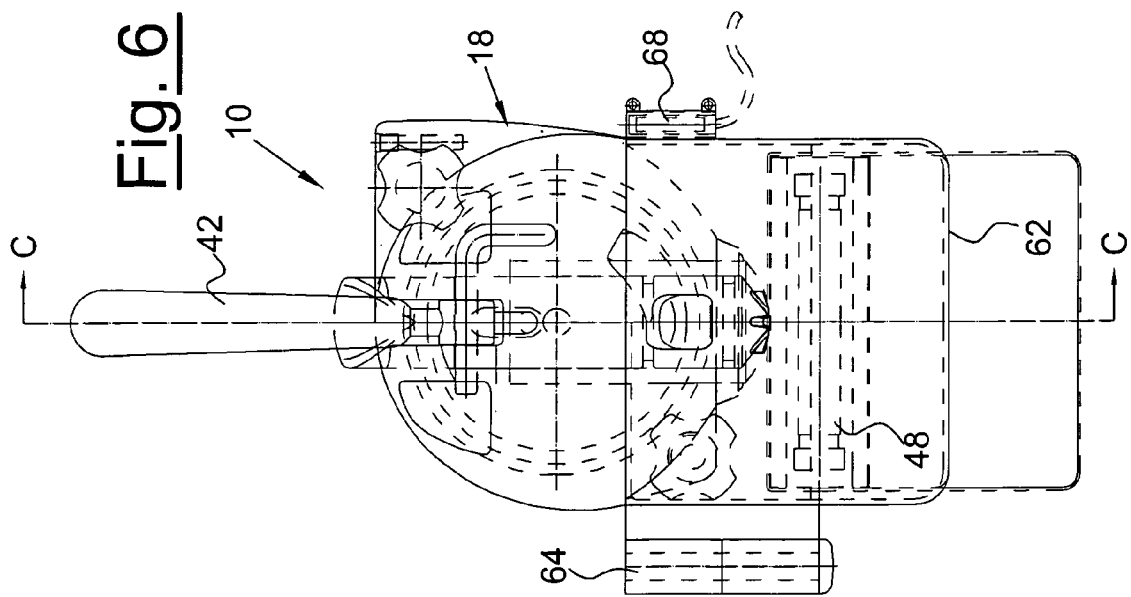
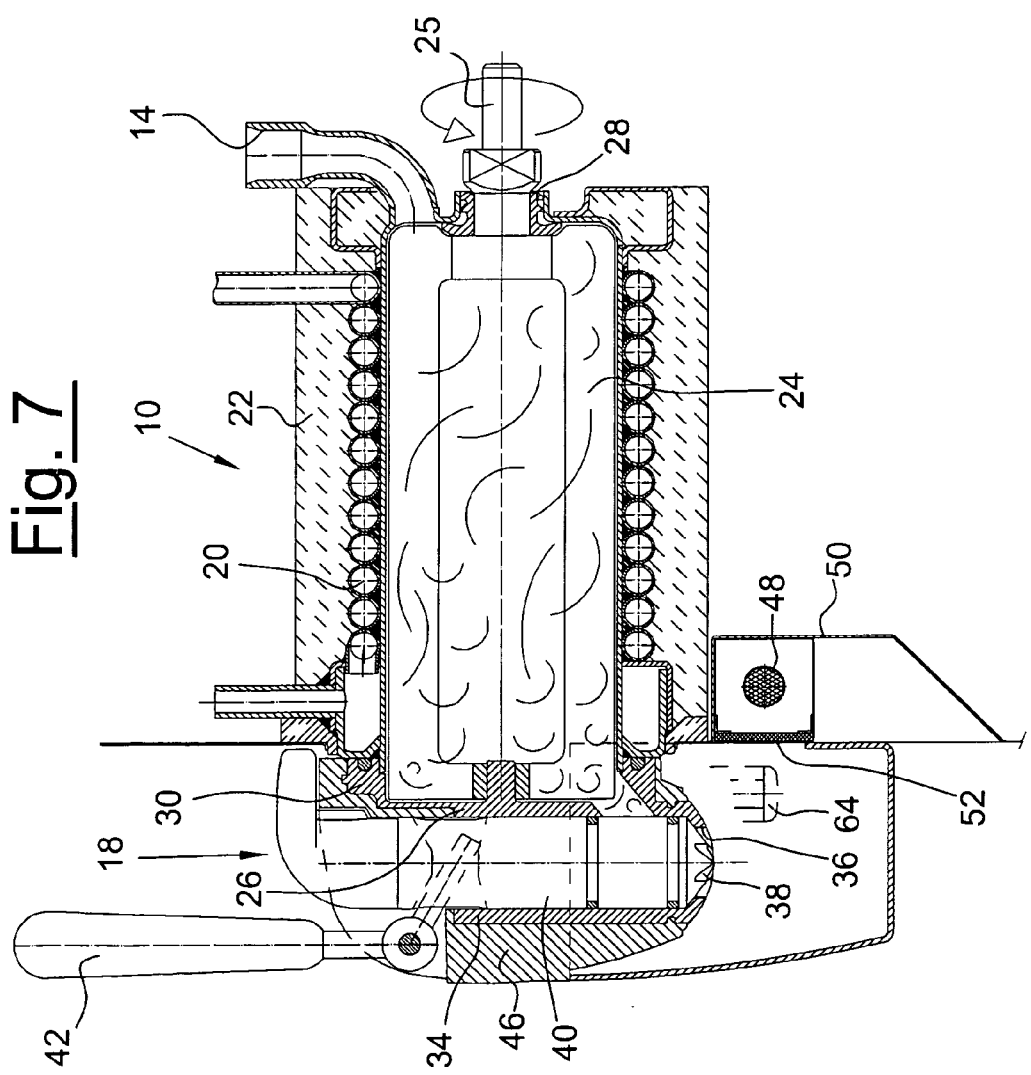

MACHINE FOR THE PREPARATION AND DISTRIBUTION OF COLD FOOD PRODUCTS

The present invention relates to a machine for the preparation and distribution of cold food products and, more specifically, a machine for the production of so-called soft ice-cream.

Machines for the production of so-called soft ice-cream according to the known art, as also machines for the production of whipped cream, are normally equipped with a cooled cylindrical chamber, in which the cold food product is prepared, and a distribution beak of the product itself, which must be preserved at a temperature normally not higher than 4° C. to guarantee its integrity.

In these known machines present on the market, the distribution beak, usually made of plastic material, is, on the contrary, always exposed to room temperature and this causes the deterioration of residues of the food product inevitably remaining attached to the tip of the beak after the distribution of each single portion of product.

Only in some cases is there a lid made of plastic material, which acts as a protection from dust and parasites that can lay down on the beak. This protection, however, does not satisfy effective hygiene requirements, as the closure is not hermetic and the closing and opening of such lid are left to the free decision of the operator.

A general objective of the present invention is therefore to solve the drawbacks mentioned above of the known art in a simple, economical and particularly functional manner.

In particular, an objective of the present invention is to provide a machine for the preparation and distribution of cold food products capable of guaranteeing perfect hygienization and sterilization of the distribution beak, eliminating or in any case drastically reducing the possibility of there remaining dangerous bacteria on said beak which could jeopardize the quality of the product itself with each new distribution.

A further objective of the present invention is to provide a machine for the preparation and distribution of cold food products wherein the hygienization and sterilization of the distribution beak are effected automatically, i.e. without the necessity of intervention on the part of the operator, after each single use of the machine itself.

In view of the above objectives, according to the present invention, a machine has been conceived for the preparation and distribution of cold food products, used in particular but not exclusively for the production of soft ice-cream, having the characteristics specified in the enclosed claims.

The structural and functional characteristics of the present invention and its advantages with respect to the known art will appear more evident from the following description, referring to the enclosed drawings, which show a machine for the preparation and distribution of cold food products produced according to the innovative principles of the invention itself.

In the drawings:

FIG. 6 shows a partially sectional front view of another embodiment of the machine for the preparation and distribution of cold food products according to the present invention; and FIG. 7 is a sectional view obtained along the line C-C of the machine of FIG. 6.

Figure 1:
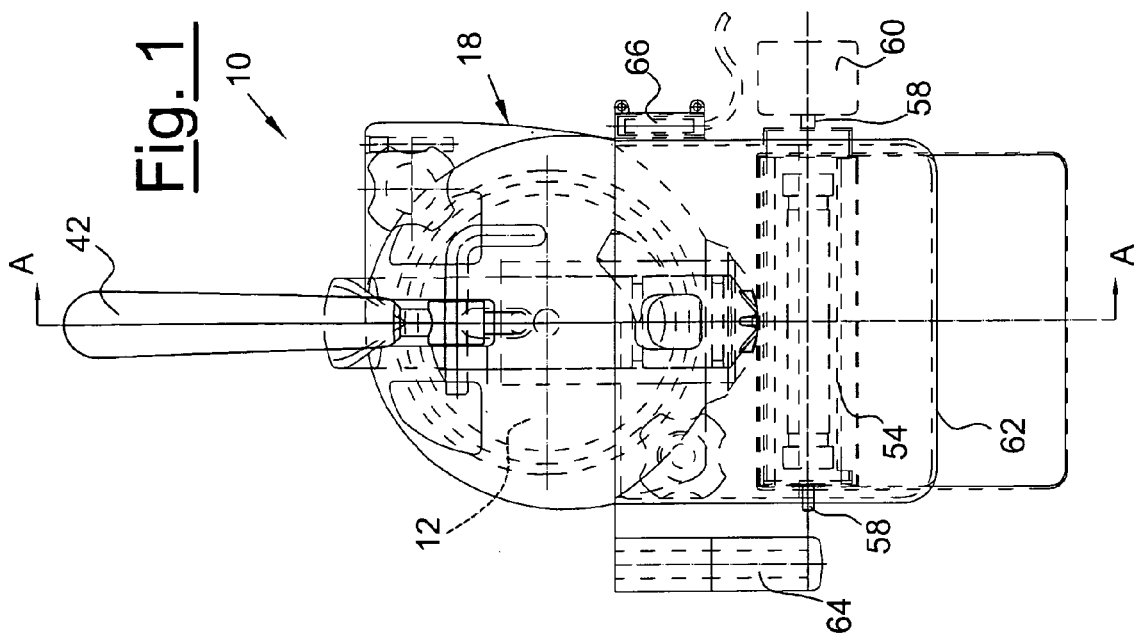
FIG. 1 shows a partially sectional front view of a machine for the preparation and distribution of cold food products, in particular a machine for the production of soft ice-cream, according to the present invention.
Figure 2:
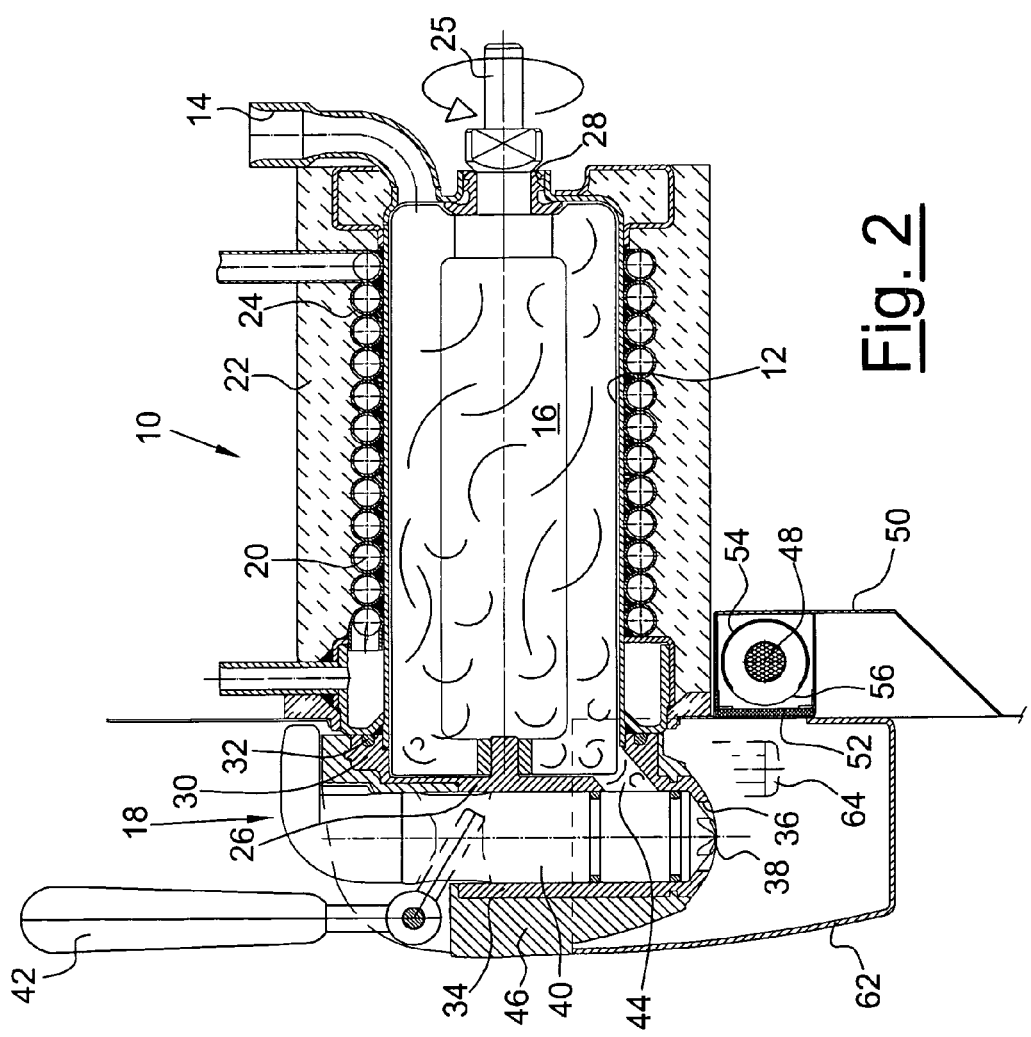
FIG. 2 is a sectional view obtained along the line A-A of the machine of FIG. 1.
Figure 3:
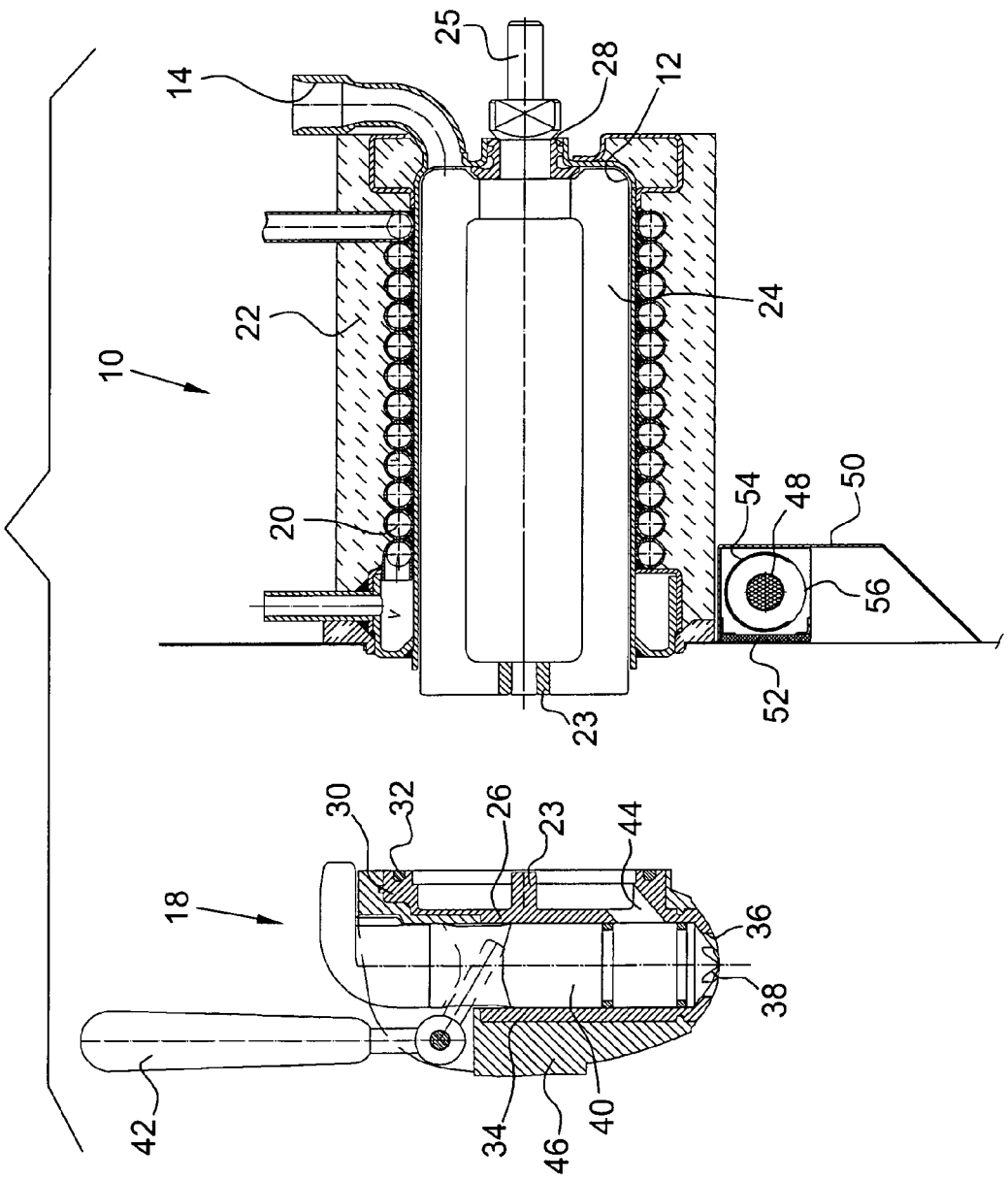
FIG. 3 shows the device of FIG. 2 in an exploded view.
Figure 4:
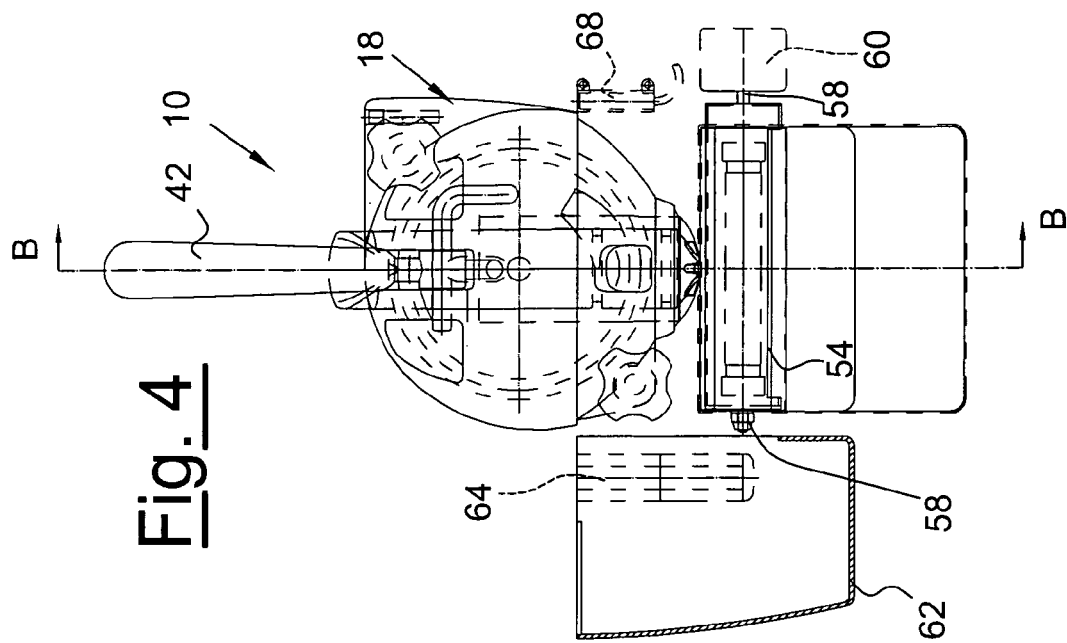
FIG. 4 shows a partially sectional front view of the machine of FIG. 1, in an open configuration.

With reference to the figures of the enclosed drawings, the machine for the preparation and distribution of cold food products in question, in particular a machine for the production of soft ice-cream, is indicated as a whole with the reference number 10. On the basis of the embodiment examples illustrated, according to the present invention, the machine 10 comprises a cylindrical chamber 12 equipped, at one of its ends, with an inlet mouth 14 for a liquid food mixture 16 and, at an opposite end, an extraction tap 18 for the distribution of the cold food product.

The cylindrical chamber 12 is externally enveloped by an evaporator group which comprises an evaporation chamber 20 where cold air is generated, situated directly in contact with the wall of the cylindrical chamber 12 and externally enveloped by an insulating casing 22.

Inside the cylindrical chamber 12, there is a mixer 24, for example for whipping ice-cream in the cylinder 12 during cooling, which comprises, at one end, an entrainment shaft 25 equipped with a sealing ring 28 which forms a rotating seal on the cylindrical chamber 12.

The opposite end of the mixer 24 and a closing flange 26 of the cylindrical chamber 12 have centering means 23, for example a ferrule coupled with a pin of the flange, suitable for allowing the rotation of the mixer 24 itself with respect to the flange 26.

On the basis of a preferred embodiment of the machine 10 according to the present invention, the closing flange 26 is made of an atoxic metallic material with a high thermal conductivity and comprises an annular wall 30 equipped with an annular cavity for a sealing ring 32. The flange 26 also comprises a housing 34 for the opening and closing organs of a nozzle 36 equipped with a shaped hole 38. In the example illustrated, the housing 34, which is cylindrically shaped, acts as a guide for the axial sliding of a piston 40, activated by a lever 42, which opens and closes a distribution span 44 of the product 16 towards the nozzle 36.

The distribution tap 18, which can be dismantled with respect to the cylindrical chamber 12, is also equipped, on the opposite side to that facing the cylindrical chamber 12 itself, with a coating of plastic material 46 for thermal insulation from the outside environment of the metallic flange 26.

According to the invention, the machine 10 is equipped with a sterilization device which comprises an ultraviolet-ray lamp 48, in particular type C ultraviolet rays, positioned on the main body of the machine 10 itself, in correspondence with the distribution nozzle 36 and inserted inside a metallic casing 50 integral with the main body of the machine 10, said ultraviolet-ray lamp 48 having the function of sterilizing the distribution nozzle 36 of the machine 10.

On its front part facing the distribution nozzle 36 and for the whole of its length, the metallic casing 50 houses a transparent wall 52, made of quartz-type glass, which allows the passage of ultraviolet rays through the nozzle 36 and at the same time protects the lamp 48 from possible spurts of product 16, water or other foreign bodies which could possibly damage it.

On the basis of a first embodiment of the invention, illustrated in FIGS. 1 to 4, the lamp is always switched on, to prevent the ultraviolet rays, which are known to be harmful for human health, emitted from the lamp 48 from being released in all directions from the casing 50 and accidentally striking the operator or other people possibly present close to the machine 10. For this reason, the lamp 48 is inserted inside a hollow cylindrical body 54, in turn contained inside the casing 50, made of stainless steel and equipped with a slit 56 axially positioned over the whole of its length to direct the ultraviolet rays exclusively in the direction of the distribution nozzle 36 to be sterilized.

In addition, the hollow cylindrical body 54 can be rotated around its own axis so that the ultraviolet rays emitted from the lamp 48 can in no way penetrate the glass 52 when the sterilization of the distribution nozzle 36 is not necessary. According to the embodiment illustrated, in order to allow the rotation of the hollow cylindrical body 54 around its axis, there are two pins 58 hinged onto the casing 50, in correspondence with the opposite ends of the body 54 itself and fixed thereto by welding, for example.

The rotation of the hollow cylindrical body 54, which is preferably effected according to an angle of about 90°, is driven by an electric motor or by a rotating electromagnet 60 whose activation rotates the hollow cylindrical body 54 to move the slit 56 from a horizontal, or operating, position, to a vertical position, in which the ultraviolet rays are not directly towards the outside, and vice versa.

To complete the sterilization device of the machine 10 according to the invention, there is therefore, underneath the distribution nozzle 36, a door 62 made of plastic material which also acts as a basin for collecting condensation drops and provides protection from dust for the nozzle 36 itself.

On one of the side walls of the door 62 there is a hinge 64 which allows the opening and closing of the door 62 itself, by rotation along a substantially horizontal plane, whereas a magnet 66 is constrained on the opposite side wall. On a wall of the main body of the machine 10, in correspondence with the magnet 66, when the door 62 is in a closed position, there is a microswitch 68 with a magnetic drive or with a mechanical lever activation which, depending on the position of the door 62, and consequently its magnet 66 or its lever, is capable of activating an electric contact to send voltage to the motor or electromagnet 60.

In practice, when the door 62 of the machine 10 is in a closed position (FIGS. 1 and 2), the magnet 66 is in the immediate proximity of the microswitch 68, thus allowing the motor or electromagnet 60 to position the hollow body 54, rotating it accordingly, with the slit 56 arranged horizontally. In this way, when the machine 10 is not distributing the food product 16 contained in its interior, the ultraviolet rays emitted by the lamp 48 are free to emerge from the metallic casing 50 to strike the distribution nozzle 36 and the whole surrounding area, sterilizing them as necessary. As the door 62 is in a closed position, it will guarantee that the ultraviolet rays do not penetrate it thus preventing them from directly coming into contact with people in the vicinity.

Figure 5:
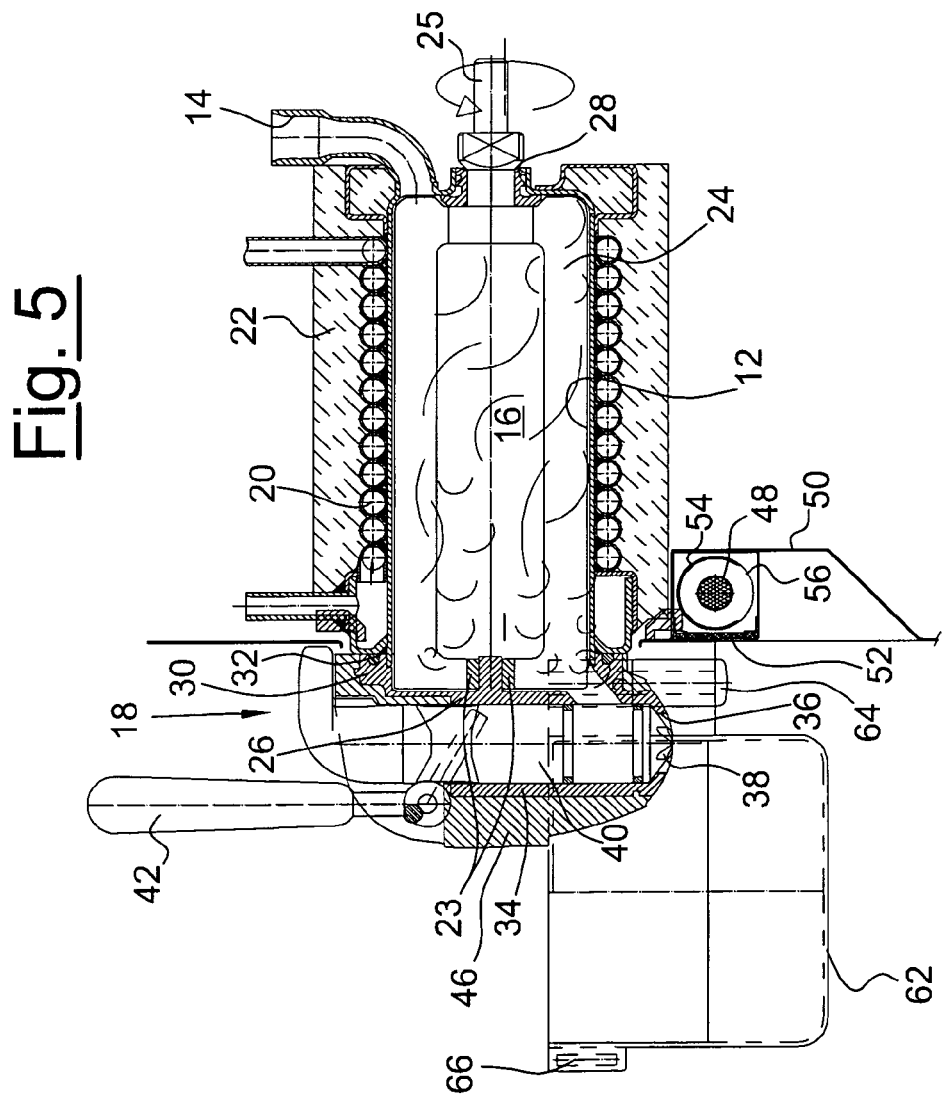
FIG. 5 is a sectional view obtained along the line B-B of the machine illustrated in FIG. 4.

Vice versa, when the operator opens the door 62 (FIGS. 4 and 5) to prepare for the distribution of the food product 16 through the distribution nozzle 36, the magnet 66, moving away from the microswitch 68, gives a new impulse to the motor or electromagnet 60 which in turn rotates the hollow cylindrical body 54 positioning the slit 56 vertically downwards to interrupt the penetration of the ultraviolet rays through the glass 52. It is consequently the metallic casing 50 of the lamp 48 which provides a shield against the ultraviolet rays to allow the operator to distribute the product 16 without any risk at all.

When the product 16 has been distributed, i.e. when the operator brings the door 62 back into the closed position, the motor or electromagnet 60 gives a new impulse to the above mechanism to allow the ultraviolet rays to pass again through the slit 56, towards the distribution nozzle 36, guaranteeing a permanent sterilization of the whole distribution beak for the complete functioning duration of the machine 10.

On the basis of a second embodiment of the invention, illustrated in FIGS. 6 and 7, the lamp 48 is switched on and off depending on whether the door 62 is closed or open. As explained above, this is due to the dangerousness of ultraviolet rays for the health of human beings. In this embodiment, the ultraviolet-ray lamp 48 can be without the hollow cylindrical body which envelops it, whereas its operating life is slightly shorter with respect to the situation in which said lamp remains permanently switched on. In any case, the sterilization functionality of the ultraviolet rays is not jeopardized as long as the lamp 48 can be switched on, and there is also a small energy saving.

In this embodiment of the invention, the switching on and off of the ultraviolet-ray lamp 48 is controlled by the microswitch 68 with a magnetic drive or by a microswitch activated by a mechanical lever which, depending on the open or closed position of the door 62 and consequently its magnet 66 or lever, is capable of activating an electric contact to send voltage to the lamp 48.

From the above description with reference to the figures, it is evident that a machine for the preparation and distribution of cold food products equipped with the sterilization device according to the invention is particularly useful and advantageous. The objectives specified in the preamble of the description are therefore achieved.

The forms of the machine for the preparation and distribution of cold food products, in particular for the production of soft ice-cream, according to the invention, as also the materials used, can obviously differ from those shown for illustrative and non-limiting purposes in the drawings.

The protection scope of the invention is therefore delimited by the enclosed claims.

The invention claimed is:

1. A machine (10) for the preparation and distribution of cold food products, used in particular but not exclusively for the production of soft ice-cream, comprising a cylindrical chamber (12) equipped at one end with an inlet mouth (14) for a liquid food mixture and at an opposite end with an extraction tap (18) for the distribution of the cold food product through at least one distribution nozzle (36), wherein said cylindrical chamber (12) is externally enveloped by an evaporation chamber (20) for the cooling of said liquid food mixture and contains in its interior, a mixer (24), and wherein underneath said distribution nozzle (36) there is a protection door (62) for said distribution nozzle (36), characterized in that said machine (10) comprises at least one continually switched on ultraviolet-ray lamp (48) positioned on the main body of said machine (10) in correspondence with said distribution nozzle (36) and inserted inside a metallic casing (50) integral with said main body, said ultraviolet-ray lamp (48) being positioned to sterilize said distribution nozzle (36) of the machine (10) wherein said ultraviolet-ray lamp (48) is inserted inside a hollow cylindrical body (54), which is in turn contained inside said casing (50), said hollow cylindrical body (54) being equipped with at least one slit (56), said hollow cylindrical body being positioned axially over said ultraviolet-ray lamp (48) in order to direct ultraviolet rays, emitted from said at least one slit (56) of said hollow cylindrical body (54), exclusively in the direction of said distribution nozzle (36), wherein said hollow cylindrical body (54) is rotatable around its own axis so that the ultraviolet rays emitted from said lamp (48) do not emerge from said metallic casing (50) when it is not necessary to effect the sterilization of said distribution nozzle (36); wherein said metallic casing (50) comprises a part facing said distribution nozzle (36), wherein said part extends along said distribution nozzle (36) and comprises at least one transparent wall (52) which allows the passage of ultraviolet rays towards said distribution nozzle (36) and protects said ultraviolet-ray lamp (48) from possible damage from spurts of product (16) or foreign bodies.

2. The machine (10) according to claim 1, characterized in that said transparent wan (52) consists of quartz-type glass.

3. The machine (10) according to claim 1, characterized in that, two pins (58), hinged onto said casing (50), are fixed, in correspondence with the opposite ends of said hollow cylindrical body (54), the function of said pins (58) being to allow the rotation of said hollow cylindrical body (54) around its own axis.

4. The machine (10) according to claim 1, characterized in that the rotation of said hollow cylindrical body (54) around its own axis is driven by an electric motor or by a rotating electromagnet (60).

5. The machine (10) according to claim 4, characterized in that at least one magnet (66) is constrained on one of the walls of said door (62), whereas at least one microswitch (68) with a magnetic drive or mechanical lever, is positioned on a wall of said main body of the machine (10), in correspondence with the magnet (66) when said door (62) is in a closed position.

6. The machine (10) according to claim 5, characterized in that said microswitch (68) is capable of driving said motor or electromagnet (60) on the basis of the reciprocal position of said magnet (66) with respect to said microswitch (68).

7. The machine according to claim 5, characterized in that said door (62) and/or said microswitch (68) with a magnetic drive or mechanical lever are capable of driving the switching on and off of said lamp (48) according to necessity.

8. The machine (10) according to claim 1, characterized in that said hollow cylindrical body (54) is made of stainless steel.

9. The machine (10) according to claim 1, characterized in that the ultraviolet rays emitted from said lamp (48) are type C ultraviolet rays.

* * * * *